US010562065B1

(12) United States Patent
Johnson et al.

(10) Patent No.: US 10,562,065 B1
(45) Date of Patent: Feb. 18, 2020

(54) SYSTEMS AND METHODS FOR APPLICATION OF POLYSILAZANE AND FLUOROACRYLATE COATING COMPOSITIONS

(71) Applicant: Newtech LLC, Cincinnati, OH (US)

(72) Inventors: Steven Martin Johnson, Franklin, OH (US); Rodney Wade, Melbourne, FL (US)

(73) Assignee: Newtech LLC, Cincinnati, OH (US)

( * ) Notice: Subject to any disclaimer, the term of this patent is extended or adjusted under 35 U.S.C. 154(b) by 0 days.

(21) Appl. No.: 15/343,193

(22) Filed: Nov. 3, 2016

Related U.S. Application Data

(60) Provisional application No. 62/272,313, filed on Dec. 29, 2015, provisional application No. 62/250,037, filed on Nov. 3, 2015.

(51) Int. Cl.
| | | |
|---|---|---|
| *B65D 1/02* | (2006.01) | |
| *B05D 1/02* | (2006.01) | |
| *B05D 3/10* | (2006.01) | |
| *B05D 1/38* | (2006.01) | |
| *B23K 1/20* | (2006.01) | |

(52) U.S. Cl.
CPC ............... *B05D 1/02* (2013.01); *B05D 1/38* (2013.01); *B05D 3/108* (2013.01); *B23K 1/20* (2013.01)

(58) Field of Classification Search
CPC . B05D 1/02; B05D 1/38; B05D 3/108; B05K 1/20
USPC ....................................................... 427/421.1
See application file for complete search history.

(56) References Cited

U.S. PATENT DOCUMENTS

| | | | |
|---|---|---|---|
| 2,564,674 | A | 8/1951 | Cherenls |
| 5,178,916 | A | 1/1993 | Chidsey et al. |
| 5,266,115 | A | 11/1993 | Taccon et al. |
| 5,821,022 | A | 10/1998 | Ohishi et al. |
| 6,207,346 | B1 | 3/2001 | Johnson |
| 6,224,180 | B1 * | 5/2001 | Pham-Van-Diep ....... B05B 1/02 347/2 |
| 6,444,378 | B1 | 9/2002 | Johnson |
| 6,660,392 | B2 | 12/2003 | Yamaguchi et al. |
| 7,141,140 | B2 | 11/2006 | MacCone et al. |
| 7,261,768 | B2 | 8/2007 | Luten et al. |
| 7,471,503 | B2 | 12/2008 | Bruner et al. |

(Continued)

FOREIGN PATENT DOCUMENTS

| | | |
|---|---|---|
| CA | 2626990 A1 | 5/2007 |
| CN | 102137722 A | 7/2011 |

(Continued)

OTHER PUBLICATIONS

Elif Alyamac & Mark D. Soucek, "Acrylate-based fluorinated copolymers for high-solids coatings", 71 Progress in Organic Coatings 213-224 (2011).

(Continued)

*Primary Examiner* — Alexander M Weddle
(74) *Attorney, Agent, or Firm* — Ulmer & Berne, LLP

(57) ABSTRACT

A hydrophobic and oleophobic coating composition includes at least a polysilazane polymer and a fluoroacrylate copolymer is applied to one or more work pieces, such as solder paste stencils, via a nebulizing spray system having one or more spray applicators. Application is accomplished by controlled operation of the spray applicator along with controlled movement of a work piece relative to the applicator.

5 Claims, 8 Drawing Sheets

(56) References Cited

U.S. PATENT DOCUMENTS

| | | |
|---|---|---|
| 7,622,157 B2 | 11/2009 | Falk et al. |
| 7,625,149 B2 | 12/2009 | Hanson et al. |
| 7,691,478 B2 | 4/2010 | Avaltroni et al. |
| 7,740,940 B2 | 6/2010 | Hanson |
| 7,879,437 B2 | 2/2011 | Hanson |
| 7,901,777 B2 | 3/2011 | Hanson |
| 7,989,069 B2 | 8/2011 | Bruner et al. |
| 8,025,974 B2 | 9/2011 | Hanson et al. |
| 8,048,487 B2 | 11/2011 | Hanson |
| 8,053,081 B2 | 11/2011 | Petcavich et al. |
| 8,067,103 B2 | 11/2011 | Hanson |
| 8,178,004 B2 | 5/2012 | Hanson |
| 8,236,426 B2 | 8/2012 | Hanson et al. |
| 8,309,228 B2 | 11/2012 | Dierdorf et al. |
| 8,329,830 B2 | 12/2012 | Yang et al. |
| 8,337,985 B2 | 12/2012 | Hanson |
| 8,432,036 B2 | 4/2013 | Hanson et al. |
| 8,445,423 B2 | 5/2013 | Bruner et al. |
| 8,524,367 B2 | 9/2013 | Hanson |
| 8,558,117 B2 | 10/2013 | Hanson |
| 8,658,258 B2 | 2/2014 | Hanson |
| 2002/0111391 A1* | 8/2002 | Ishizeki .................. C09D 4/00 522/120 |
| 2003/0234272 A1 | 12/2003 | Lamothe et al. |
| 2004/0023048 A1 | 2/2004 | Schwartz et al. |
| 2008/0131709 A1 | 6/2008 | Hanson et al. |
| 2008/0152930 A1 | 6/2008 | Hanson |
| 2009/0140028 A1 | 6/2009 | Forti et al. |
| 2009/0317554 A1 | 12/2009 | Christensen et al. |
| 2010/0004583 A1* | 1/2010 | Panos .................. A61N 1/0436 604/20 |
| 2010/0015453 A1 | 1/2010 | Yamaguchi et al. |
| 2010/0331487 A1 | 12/2010 | Yang et al. |
| 2010/0331498 A1 | 12/2010 | Yang et al. |
| 2011/0195246 A1 | 8/2011 | Hanson et al. |
| 2012/0189843 A1 | 7/2012 | Chang et al. |
| 2013/0037161 A1 | 2/2013 | Hanson et al. |
| 2013/0229378 A1 | 9/2013 | Iyer et al. |
| 2014/0272150 A1 | 9/2014 | Hanson |
| 2014/0272428 A1 | 9/2014 | Hanson |
| 2014/0329001 A1 | 11/2014 | Rouaud et al. |
| 2015/0030856 A1* | 1/2015 | Singh .................. B82Y 30/00 428/408 |
| 2015/0252656 A1 | 9/2015 | Hanson |
| 2015/0314308 A1* | 11/2015 | Massa .................. B05B 7/0815 427/427.2 |

FOREIGN PATENT DOCUMENTS

| | | |
|---|---|---|
| EP | 0513727 A2 | 11/1992 |
| EP | 0513727 B1 | 8/1995 |
| EP | 0745568 A1 | 12/1996 |
| EP | 0745567 B1 | 4/1999 |
| EP | 0745568 B1 | 7/1999 |
| EP | 1378526 A1 | 7/2004 |
| EP | 1955638 B1 | 4/2012 |
| EP | 1570014 B1 | 3/2013 |
| NO | 2006071981 A1 | 7/2006 |
| WO | 2008042986 A2 | 4/2008 |
| WO | 2008060582 A2 | 5/2008 |
| WO | 2008060583 A2 | 5/2008 |
| WO | 2009008993 A2 | 1/2009 |
| WO | WO-2014102063 A1 * | 7/2014 .......... B05B 7/0815 |

OTHER PUBLICATIONS

Steve Henly, "New Generation Fluoropolymer Coatings for Electronic Applications", Feb. 9, 2011; 5 pages.

"3M Electronic Grade Coatings", Walborn A/S, Sep. 21, 2013 (available at: www.walbom.dk/ref.aspx?id=4858); 3 pages.

"Features and Benefits—Lumiflon FEVE Resins", http://lumiflonusa.com/features-benefits/ (accessed Feb. 25, 2016); 9 pages.

International Search Report (ISR) and Written Opinion of the Searching Authority in App No. PCT/US2016/060410 dated Mar. 17, 2017.

* cited by examiner

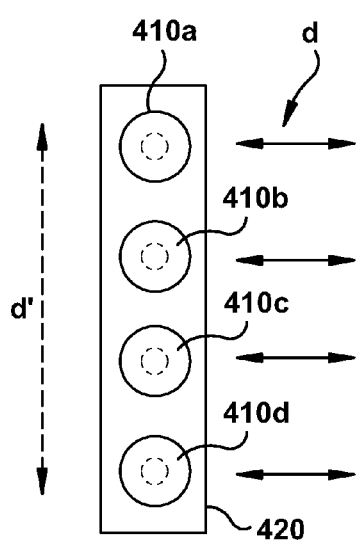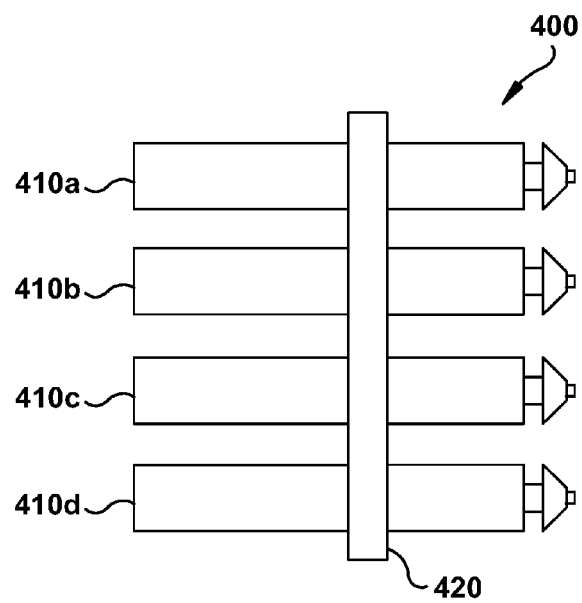
Fig. 4A
Fig. 4B
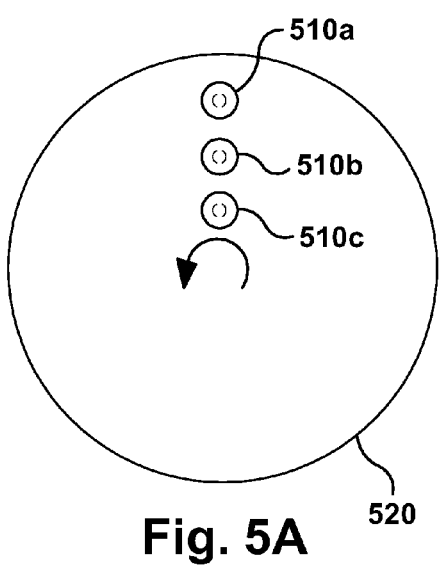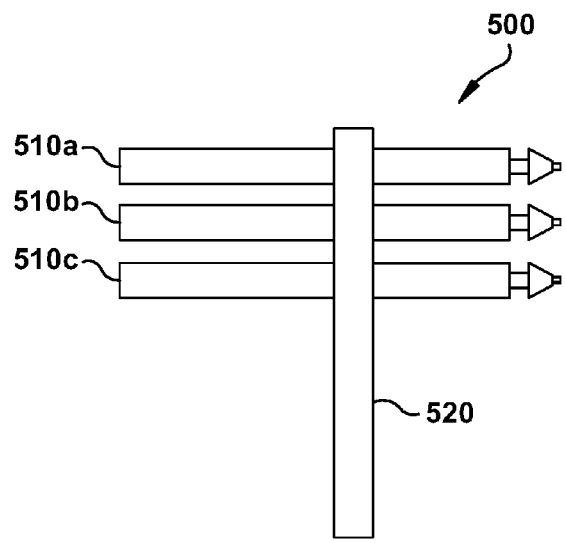
Fig. 5A
Fig. 5B

SYSTEMS AND METHODS FOR APPLICATION OF POLYSILAZANE AND FLUOROACRYLATE COATING COMPOSITIONS

CROSS REFERENCE TO RELATED APPLICATIONS

This application claims the benefit of U.S. Provisional Patent Application Ser. No. 62/250,037, filed on Nov. 3, 2015, entitled "SYSTEM AND METHOD FOR APPLICATION OF POLYSILAZANE AND FLUOROACRYLATE COATING COMPOSITION" and U.S. Provisional Patent Application Ser. No. 62/272,313, filed on Dec. 29, 2015, entitled "SYSTEM AND METHOD FOR APPLICATION OF COATING COMPOSITIONS," the disclosures of which are hereby incorporated by reference in their entirety.

TECHNICAL FIELD

The present disclosure generally relates to hydrophobic and oleophobic coatings applied to surface mount technology (SMT) stencils. More particularly, the present disclosure generally relates to application of curable coating compositions including a polysilazane and a fluoroacrylate copolymer that produce highly durable and effective coating layers in a single-step curing process, wherein such coating layers can have hydrophobic and oleophobic properties and can be used to coat SMT stencils (e.g., solder paste stencils). The present disclosure also generally relates to a hybrid application technology in which a nanometers thick coating can be applied to the surface of the print side of the stencil and a thicker coating can be applied to the walls of the apertures.

BACKGROUND

Compositions that form hydrophobic and oleophobic coatings can be useful to render surfaces repellant to both water-based and organic-based materials. Such surfaces having hydrophobic and oleophobic properties would generally be easier to clean, be non-staining, and have a low surface energy. Surfaces with a low surface energy can be useful, for example, in relation to industrial and consumer goods to provide a high degree of slip, or anti-stiction, to materials that contact the surface. Prior hydrophobic and oleophobic coatings, however, often suffer from a number of detriments that prevent their widespread adoption, including poor durability, relatively thin coatings, and the need to apply the coating using a multi-step process. Therefore, there is a need for a durable coating and a simplified application process whereby the durable coating can easily be applied to render a substrate both hydrophobic and oleophobic.

SUMMARY

In accordance with one example embodiment, a system and method is taught for application of a coating composition including a polysilazane and a fluoroacrylate copolymer, the polysilazane suitably having at least one reactive site.

In accordance with another example embodiment, an air-brush applicator for forming a coated article includes coating a substrate with a coating composition including a polysilazane and a fluoroacrylate copolymer wherein the polysilazane has at least one reactive site. The coated article can include solder paste stencils or any other suitable article.

In accordance with yet another example, an applicator for forming a coated article includes coating a substrate with a hydrophobic coating layer adhering to at least a portion of the substrate. The hydrophobic coating layer is applied so as to be formed from a coating composition including a polysilazane and a fluoroacrylate copolymer wherein the polysilazane has at least one reactive site. The applicator comprises an air brush configured to move relative to one or more work pieces so as to apply the coating, such as to a solder paste stencil, in accordance with defined application parameters.

BRIEF DESCRIPTION OF THE DRAWINGS

It is believed that certain embodiments will be better understood from the following description taken in conjunction with the accompanying drawings, in which like references indicate similar elements and in which:

FIGS. 4A-B are simplified block diagrams of at least one embodiment of an applicator with a linear array of individual spray systems for applying a coating to a work piece;

FIGS. 5A-B are simplified block diagrams of at least one embodiment of an applicator with a rotatable array of individual spray systems for applying a coating to a work piece;

DETAILED DESCRIPTION

Figure 1:
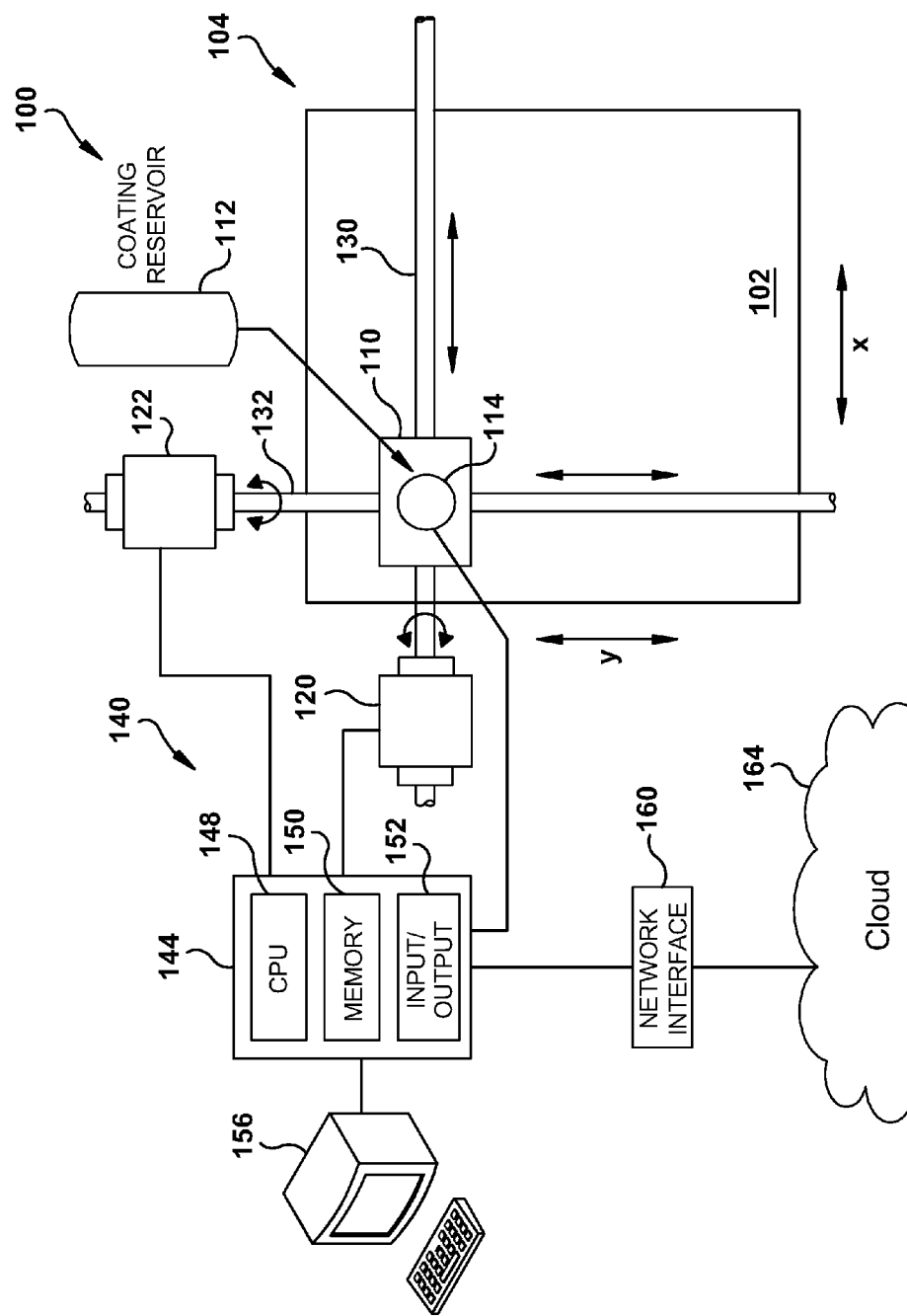
FIG. 1 is a simplified block diagram of at least one embodiment of a coating application system for coating a work piece.

Coating compositions that impart hydrophobic and oleophobic qualities to a substrate can generally include a suitable polysilazane and a suitable fluoroacrylate copolymer. On a dry solids weight basis, the fluoroacrylate copolymer can be included in a coating composition at about 1 part fluoroacrylate copolymer to about 3 parts polysilazane in certain embodiments, up to about 1 part fluoroacrylate copolymer to about 800 parts polysilazane in other certain embodiments. In certain embodiments, the combined fluoroacrylate copolymer and polysilazane can constitute, on a dry solids weight basis, from about 0.1% to about 90.0% of a coating composition, from about 20% to about 60% of the coating composition in certain embodiments, and from about 30% to about 40% of the coating composition in certain embodiments.

Suitable polysilazanes can generally include curable oligomeric and polymeric polysilazanes having a common repeating unit represented by Formula 1.

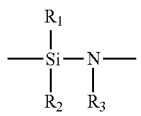

Formula 1 wherein $R_1$, $R_2$, and $R_3$ are each independently hydrogen, an organic group, a heterorganic group, or a combination thereof.

Specific polysilazanes useful in the formation of a coating composition can include polysilazanes that have at least one chemically reactive site. For example, suitable polysilazanes can include one, or more, of the following reactive sites: silicon-nitrogen linkages, hydrogen bonds, and carbon-carbon bonds. As can be further appreciated, such polysilazanes can be any polymer that has at least one linear, cyclic, or branched main chain or backbone formed from repeating Si—N linkages.

The specific molecular structure, molecular weight, and functional groups of suitable polysilazanes can be tailored to meet the particular properties and performance desired in a coating composition. For example, in certain embodiments, a suitable polysilazane can have a number average molecular weight of about 100 to about 50,000 to ensure the coating composition can be applied to a substrate in liquid form.

Suitable polysilazanes can be produced through any desirable process including, for example, the process disclosed in U.S. Pat. No. 2,564,674 which is hereby incorporated by reference in its entirety. As will be appreciated, other methods can also be used to produce suitable polysilazanes.

Modified polysilazanes or polysilazane copolymers can also be utilized. Such modified polysilazanes or polysilazane copolymers can have random, alternating, or block copolymer structures or combinations. Modified polysilazanes and copolymers can be produced in a suitable aprotic solvent, such as, for example, ethyl acetate, t-butyl acetate, or combinations thereof and can be further diluted by one, or more, solvents if desired.

Alternatively, suitable polysilazanes can be commercially obtained. Examples of commercially available suitable polymers include, for example, Ceraset® 20 from Kion Corp. (Huntington Valley, Pa.,) with has the following structure of Formula 2:

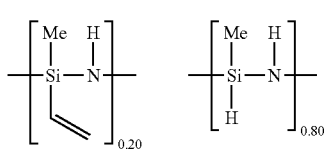

Formula 2

Another commercially available polysilazane is VL 20 from Kion Corp. (Huntington Valley, Pa.) with has the structure of Formula 3:

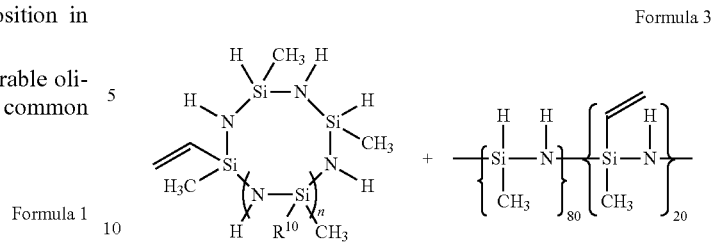

Formula 3 wherein n is an integer value ranging from 1-20, and $R^{10}$ is hydrogen or a vinyl group.

Other commercially available polysilazane polymers include, but are not limited to those sold under the trade name, Metal Protector from nanoShell Coatings (Plymouth, Devon, UK), Durazane from A.Z. Chemicals (Charlotte, N.C., USA), Polymeric Silazane Finish ("PSF") from KadKo Incorporated (Beech Grove, Ind.), and MC156 from NIC Industries (White City, Oreg.).

In certain embodiments, a polysilazane can be prepared as a solution in a suitable solvent such as, for example, an aprotic solvent. Such solvents are well known and include, as illustrative examples, tert-butyl alcohol, and amyl acetate. It will be appreciated that other suitable aprotic solvents may be used.

Additional solvents that can be suitable for dilution of the polysilazane or the coating composition include fluorinated solvents such as ethyl nonafluorobutyl ether, ethyl nonafluoroisobutyl ether, and parachlorobenzotrifluoride. Examples of commercial fluorinated solvents include Novec™ hydrofluoroether solvents available from 3M Corporation (St. Paul, Minn.) and Galden® perfluorinated fluids available from Solvay Chemicals (Orange, Tex.).

In certain embodiments, additional solvents such as mineral spirts and hydrocarbon solvents can also be present in the coating composition.

Suitable fluoroacrylate copolymers useful for inclusion in the coating composition can include copolymers having at least a fluorinated moiety and an acrylate moiety. Such fluorinated moieties can generally be represented by Formula 4:

    Formula 4 wherein R is a monovalent or multivalent, linear, branched, alicyclic or aromatic, fluorinated or perfluorinated, organic or heterorganic group, or a combination thereof containing at least one perfluorinated carbon atom and (a) is at least 1; and Y is independently a covalent bond or a divalent linear, branched, alicyclic, or aromatic organic or heterorganic linking group or a combination thereof, and can optionally be fluorinated or perfluorinated, and can optionally have cross-linkable sites, and (b) is 0 or greater.

Suitable acrylate moieties for the fluoroacrylate copolymer can generally be represented by Formula 5:

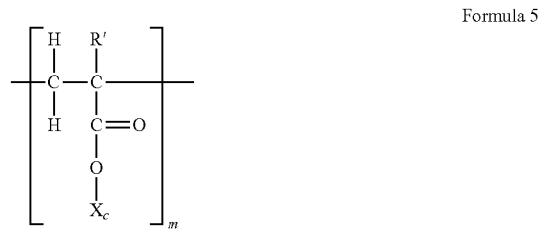

Formula 5 wherein $X_c$ can be a monovalent or multivalent, linear, branched, alicyclic or aromatic, fluorinated or perfluorinated, organic or heterorganic group or a combination thereof, and contains at least one perfluorinated carbon atom and c is a least 1; R' is H, $CH_3$, F, or another functional group; and m is at least 2. As can be appreciated, in certain embodiments, $X_c$ can also be $R_{(a)}$—$Y_{(b)}$ as represented in Formula 4.

As will be appreciated, suitable fluoroacrylate copolymers can contain additional functional groups or moieties in addition to the fluorinated moieties and acrylate moieties. The inclusion of other functional groups and the properties of the bulk fluoroacrylate copolymer can be selected to tailor specific properties of the coating composition including, for example, adhesion strength, viscosity, and durability.

In certain embodiments, suitable fluoroacrylate copolymers can react with at least one of the reactive sites of a suitable polysilazane polymer. For example, a fluoroacrylate copolymer can react with one or more of the silicon-nitrogen, nitrogen-hydrogen, silicon-hydrogen, or hydrogen bonding reactive sites on a suitable polysilazane. As will be appreciated, the structure of the fluoroacrylate copolymer can influence the degree and kinetics of such a reaction. For example, in certain embodiments, the fluoroacrylate can be linear, or branched, and can be of any suitable molecular weight.

In certain embodiments, it can be useful to react the fluoroacrylate copolymer with a polysilazane in a liquid solution. Suitable fluoroacrylate copolymers can be produced as a solution by dissolving a solid fluoroacrylate copolymer in a suitable solvent. In such solutions, the weight percent of solid fluoroacrylate copolymer can vary from about 0.1% to about 10%, or more, in certain embodiments, from about 0.5% to about 5% in certain embodiments, and from about 1.0% to about 2.0% in certain embodiments. It can be appreciated that the fluoroacrylate copolymer solution can, however, be further diluted by one or more solvents as needed depending on the desired properties of the coating composition.

The solvent or combinations of solvents chosen can be determined by the solubility of the monomers and resultant polymers. Conventional solvents such as ethyl acetate, t-butyl-acetate, methyl ethyl ketone, and acetone can be used. As can be appreciated however, fluorinated solvents can also be used including chlorofluorocarbon solvents, hydrofluoroether solvents, and the like. In certain embodiments, combinations of conventional solvents and fluorinated solvents can also be used to modify the solubility and boiling points of the coating composition. Modification and selection of such combinations can be used to tailor the properties of the coating composition including for example, drying and curing times, or substrate compatibility. As a specific example, a less viscous solution can be used when the coating composition is intended for use on smoother substrates.

Suitable fluoroacrylate copolymers can be produced by any known method including for example, the methods disclosed in International Application WO 2006/071981; U.S. Pat. No. 5,821,022; and European Patent App. 1,378,526 each herein incorporated by reference in their entirety. A journal article by Alyamac and Soucek, in Progress in Organic Coatings 71 (2011) 213-224, further discusses methods useful in the preparation of fluoroacrylate copolymers.

Alternatively, in certain embodiments, commercial fluoroacrylate copolymers can be used. For example, commercial fluoroacrylate copolymers including APG-658 and APG-801 by Advanced Polymer Inc. (Carlstadt, N.J.), Novec 1700 and Novec 2702 by 3M Co. (St. Paul, Minn.) and APS 2324CA can be used as suitable fluoroacrylate copolymers. In certain embodiments, Novec 1720, a 0.1% fluorosilane available from 3M Co. (St. Paul, Minn.) can also be used.

A coating composition can be formed from mixing a suitable solution of polysilazane and a suitable solution of fluoroacrylate copolymer. In certain embodiments, additional solvents can be added to improve certain properties of the coating composition such as, for example, the solubility and boiling point of the coating composition. The additional solvent can be an aprotic solvent, a fluorinated solvent, or a combination thereof. Selection and quantity of the solvent compounds can allow the coating composition to be tailored for specific substrates and for drying time.

In certain embodiments, the coating composition can be formed from the mixture of polysilazane and fluoroacrylate copolymer by slowly mixing with a low-shear mixer or other appropriate stirring mechanism until a homogenous composition is reached. For example, mixing speeds of about 200 rpm to about 500 rpm can be used. The coating composition can, in certain embodiments, be formed at room temperature (e.g., at about 23° C.).

As can be appreciated, other additives can be added to the coating composition in certain embodiments. For example, one or more color dyes or pigments, UV or light stabilizers, anti-oxidants, flame retardants, antimicrobial compounds, stabilizers, fillers, solvents, rheology modifying agents, or other ancillary material can be added to the coating composition. Such additives can be added to the coating composition in any order and in any suitable quantity. Fillers can be used to adjust rheology, reduce polymer demand, improve hardness, scratch-resistance, modulus or other properties. Non-limiting examples of such fillers include inorganic particles such as, for example, silicon dioxide, aluminum oxide, cerium oxide, tin oxide, zinc oxide, clays, barium sulfate, and talc. Organic functional fillers and powders, including for example, micronized polytetrafluoroethylene can also be used.

Additionally, one or more, monomers, oligomers or polymers can be incorporated into the coating composition to impart, or control, certain qualities of the coating composition. Non-limiting examples of such additional monomers, oligomers, and polymers include epoxies, urethanes, acrylics, and silicone.

In certain embodiments, a coating composition can be filtered once mixed using any known filtering technique such as, for example, through use of filter paper, filter cartridges, or filter bags. Filtering can be performed to remove certain additives or to create a more uniform distribution of additives and the filter size and level can be selected based on these application requirements. A suitable example of a filtering method is the use of 0.45 micron polytetrafluoroethylene syringes filter to filter the coating composition.

The coating composition can be used immediately or stored for future use. The coating composition can be stable and used indefinitely, as long as the components remain in solution. However, for long-term storage of the coating composition, it can be advantageous to contain or vent ammonia which is gradually outgassed from polysilazane. Such outgassed ammonia can be contained or vented by any suitable means. Alternatively, the ammonia can also be displaced by inert nitrogen gas.

The coating composition can be applied to a substrate and cured in a single-step process to form a hydrophobic and oleophobic coating layer on the substrate. The curing process can involve the evacuation of the solvent through evaporation and the coincident curing of the reactive components. Evacuation of the solvent can take place at ambient temperature or can be accelerated by use of elevated temperatures (e.g., temperatures of about 100° C. or more). However, it should be appreciated that elevated temperatures are not needed and the entire curing process can take place at about room temperature (e.g., at about 23° C.).

In certain embodiments, the reactive components can cure through one, or more, coincident reactions including reaction of the fluoroacrylate copolymer with reactive groups on the polysilazane; independent curing of the polysilazane; and covalent bonding of silanol groups on the polysilazane to hydroxyl groups of the substrate. Such reactions are considered coincident in that the reactions take place in the same process step but not necessarily the same time. For example, in certain embodiments, at least one of the reactions can take place at a different time than one of the other reactions. For example, the polysilazane can bond to a substrate before reacting to the fluoroacrylate copolymer in certain embodiments. The coincident reactions can occur in a single process step that occurs over a period of time from about a 0.5 hour to about 120 hours. As will be appreciated, the selection of particular polysilazanes, and fluoroacrylate copolymers can affect the amount and quantity of reactions between such components and the ultimate properties of the cured coating composition.

In certain embodiments, moisture can be introduced, directly or indirectly, to accelerate the reaction. Additionally, or alternatively, known moisture curing catalysts can also be included in the coating composition. Such catalysts can include, but is not limited to, ammonia and the catalysts disclosed in U.S. Patent App. No. 2010/0331498 herein incorporated by reference. Moisture cure catalysts can be present in amounts ranging from about 0.1% to about 10%, by weight, based on a dry weight basis of the catalyst and polysilazane. Curing can be accomplished at room temperature or thermal energy may be utilized including, for example, convection or induction heating, irradiation from an electron beam generator or microwave, or radiation.

Such coating compositions can be applied to a large variety of articles including, without limitation, stencils, mobile devices, glass substrates in transportation and construction industries, polymeric parts, metal parts, and paint surfaces. Specific substrates can offer specific benefits. For example, substrates with oxides on the surface such as cold rolled steel, iron, copper, brass, stainless steel, glass, ceramics, and the like will enable covalent bonding to the coating composition by bonding to silanol groups of certain polysilazane polymers. In such cases, hydroxyl groups on the substrate can be activated in any suitable process, such as, for example, the use of an alkaline cleaner. However, the coating composition can still be applied to surfaces, such as certain polymers, without hydroxyl groups. On such substrates without hydroxyl groups, the coating composition can adhere, for example, through physical force.

In certain embodiments, a polysilazane and fluoroacrylate coating composition can also be used as an additive to improve other coating materials and resins. Additionally, the coating composition can also be utilized as a surface-active agent, to coat, for example, inorganic fillers, thus improving hydrophobicity, oleophobicity, or dispensability.

The coating composition can exhibit a variety of beneficial qualities when cured on a substrate. For example, the coating can be a thick, durable coating that has a high degree of hydrophobicity and oleophobicity. In certain embodiments, the contact angle of water on the cured hydrophobic coating layer can be about 80° to about 120°, or more, when measured in accordance with ASTM D7334-08. A water contact angle of about 80° to about 120°, or more, can indicate the coating layer is hydrophobic.

In certain embodiments, the contact angle of n-hexadecane on the cured hydrophobic coating layer can be about 50° to about 80°, or more. Measurement of the contact angle of n-hexadecane can generally indicate oleophobicity with contacts angles of about 50° to about 80°, or more, considered oleophobic. Oleophobicitiy can, in certain embodiments, also be indicated by the speed at which a drop of isopropyl alcohol pulls back from a cured coating layer.

Additionally, the cured coating composition can have a low surface energy. The surface energy of a coating measures the ability of a coating to repel liquids and solids. The coating composition can, in certain embodiments, exhibit a surface energy of about 10 to about 20 dynes/cm$^2$.

In certain embodiments, the cured coating composition can be applied over a wide range of thicknesses. The thickness of the coating can be dependent on the application and environment in which the coated article is employed. For example, the coating composition can be as thin as about 0.1 micron while retaining good durability but can be produced in thicker layers if desired. For example, the coating can have a thickness from about 0.1 micron to about 10 microns in certain embodiments, from about 10 microns to 100 microns in certain embodiments, and from about 100 microns to about 1 mm in certain embodiments. The use of thicker layers can be useful, for example, when the coating composition is applied to rough substrates as a thicker coating can conform to irregularities in the substrate and create a substantially planar surface.

EXAMPLES

Inventive examples (identified as Examples 1-12) were prepared by mixing the components listed in Tables 1A and 1B, by weight, in a 1 L glass beaker using a IKA RW 20 digital mixer (Cole-Parmer Co.) fitted with a Jiffy LM mixer blade (Jiffy Mixer Co.). Details of the components included in Table 1 include:

Polysilazane 1: nanoShell Permanent Protector from nanoShell Company (Plymouth, Devon, UK), polysilazane dissolved in tert-butyl acetate;

Polysilazane 2: PSF from KadKo Inc. (Beech Grove, Ind.), polysilazane dissolved in amyl acetate and hydrocarbon solvent;

Polysilazane 3: Cerakote™ MC156 from NIC Industries (White City, Oreg.), polysilazane dissolved in tert-butyl acetate;

Fluorinated acrylate copolymer 1: APG-658 from Advanced Polymer Inc. (Carlstadt, N.J.), fluorinated acrylate copolymer dissolved in mineral spirits;

Fluorinated acrylate copolymer 2: APG-801 from Advanced Polymer Inc., fluoroacrylate dissolved in mineral spirits;

Fluorinated acrylate copolymer 3: Novec™ 2702 from 3M Co. (St. Paul, Minn.), fluorinated acrylate copolymer dissolved in ethoxy-nonfluorobutane solvent;

Solvent: Oxsol® 100 from MANA Co. (New York, N.Y.), parachlorobenzotrifluoride.

TABLE 1A

| Component | Example 1 | Example 2 | Example 3 | Example 4 | Example 5 | Example 6 |
|---|---|---|---|---|---|---|
| Polysilazane 1 | 200 g | 200 g | — | — | 200 g | 200 g |
| Polysilazane 2 | — | — | 160 g | 160g | — | — |
| Polysilazane 3 | — | — | — | — | — | — |
| Fluorinated acrylate copolymer 1 | 18 g | — | — | 8 g | 18 g | — |
| Fluorinated acrylate copolymer 2 | — | 18 g | 8 g | — | — | 18 g |
| Fluorinated acrylate copolymer 3 | — | — | — | — | — | — |
| Solvent | — | — | — | — | 18 g | 18 g |

TABLE 1B

| Component | Example 7 | Example 8 | Example 9 | Example 10 | Example 11 | Example 12 |
|---|---|---|---|---|---|---|
| Polysilazane 1 | — | — | 200 g | — | — | — |
| Polysilazane 2 | 160 g | 160 g | — | 160 g | — | — |
| Polysilazane 3 | — | — | — | — | 220 g | 200 g |
| Fluorinated acrylate copolymer 1 | — | 8 g | — | — | — | — |
| Fluorinated acrylate copolymer 2 | 8 g | — | — | — | — | — |
| Fluorinated acrylate copolymer 3 | — | — | 56 g | 56 g | 66 g | 66 g |
| Solvent | 12 g | 12 g | 54 g | 54 g | — | 34 g |

The components of each inventive example were added in successive steps beginning with the polysilazane component which was added with agitation of about 200 revolutions per minute ("RPM"). Subsequently, the fluorinated acrylate copolymer was added to the solution and mixed for about 30 minutes. During mixing, the solution was maintained at about 23° C. and was covered with a polyethylene film to prevent evaporation of the solvent.

In Examples 5-10, and 12 additional solvent was added to the solution and mixed at 23° C. for an additional 30 minutes. All compositions were filtered through a 0.45 micron polytetrafluoroethylene syringe filter obtained from Cole-Parmer Co. (Vernon Hills, Ill.). Examples were then spray coated onto 4"×4" No. 304 stainless steel coupons that were 10 microns thick. The stainless steel surface was first prepared by scrubbing with isopropyl alcohol, then scrubbing with TC 832 alkaline cleaner (available from Tru-Chem Company, Inc. of Columbus, Ohio), rinsed with deionized water, and then allowed to dry. The coatings were sprayed to produce a dry film having a thickness of approximately 4 microns. After spray coating, each sample was allowed to sit for 30 minutes at ambient temperature. The samples were then placed in an oven for 1 hour at 75° C. and at 50% relative humidity. After cooling, the samples were allowed to sit at ambient temperature for an additional 48 hours prior to testing.

Examples 1 to 12 were tested for various physical properties as depicted in Table 2. Repellency to water was measured by contact angle against deionized water using a PG-X Goniometer available from TMI Instruments (New Castle, Del.). Repellency to organic liquids was measured by dropping isopropyl alcohol onto the sample with a pipette from 6 inches above the surface. Once the drop contacted the surface, the speed at which the drop pulled back into itself was rated on a 0-5 scale, where 0 was no pull-back and 5 indicated an immediate pull-back. Hardness was measured by using a pencil hardness tester, according to ASTM D-3363. Test equipment was obtained from Paul Gardner Company (Pompano Beach, Fla.). Adhesion was measured using a cross-hatch adhesion tester, according to ASTM D-3359 with an instrument from Precision Gage and Tool (Dayton, Ohio). Solvent resistance was measured by rubbing isopropyl alcohol ("IPA") and acetone on the surface with a pipette, allowing the solvent to sit for 60 seconds, and then rubbing with a Q-tip. Observations were recorded as to whether the coating suffered visible damage. If the coating was not damaged, a ("+") was recorded. If the coating was damaged, a ("−") was recorded.

TABLE 2

| | Contact Angle Water (Degrees) | IPA Pull-Back | Pencil Hardness | Cross-Hatch Adhesion | Solvent Resistance IPA | Solvent Resistance Acetone |
|---|---|---|---|---|---|---|
| Example 1 | 96.4 | 1 | 8 H | 100 | + | − |
| Example 2 | 94.4 | 3 | 8 H | 100 | + | + |
| Example 3 | 96.2 | 3 | 8 H | 100 | + | + |
| Example 4 | 96.2 | 3 | 8 H | 100 | + | + |
| Example 5 | 96.6 | 1 | 8 H | 100 | + | − |
| Example 6 | 94.2 | 3 | 8 H | 100 | + | + |
| Example 7 | 95.5 | 3 | 8 H | 100 | + | + |
| Example 8 | 96.5 | 3 | 8 H | 100 | + | + |
| Example 9 | 94.2 | 3.5 | 8 H | 100 | + | + |
| Example 10 | 103.2 | 3 | 8 H | 100 | + | + |
| Example 11 | 103.5 | 5 | 9 H | 100 | + | + |
| Example 12 | 103.3 | 5 | 9 H | 100 | + | + |

As reported in Table 2, Examples 1 to 12 had a variety of good physical properties. For example, each of Examples 1 to 12 were hydrophobic as they exhibited water contact angles greater than about 90°. Additionally, each of Examples 1 to 12 also had strong adhesion and strength as demonstrated by positive results in the pencil hardness test, the cross hatch adhesion test, and solvent resistance tests. Oleophobicity was observed for Examples 2 to 4 and Examples 6 to 12 as evidenced by isopropyl alcohol pull-back results of at least 3.

Examples 1 to 12 were also measured for abrasion resistance according to ASTM D-2486 by rubbing each sample 2,000 times with 100% cotton, deionized water, or isopropyl alcohol using a JTX-11 instrument, available from Pushen Chemical Machinery Company (Shanghai, China). The water contact angles after abrasion testing are reported in Table 3. Examples 3, 7, and 10-12 demonstrated strong abrasion resistance by exhibiting little decrease in water contact angles.

TABLE 3

| | 100% Cotton (degrees) | Water (degrees) | IPA (degrees) |
|---|---|---|---|
| Example 1 | 85.1 | 71.6 | 66.9 |
| Example 2 | 88.4 | 85.8 | 87.3 |
| Example 3 | 94.2 | 96.1 | 91.4 |
| Example 4 | 88.2 | 88.2 | 76.9 |
| Example 5 | 85.1 | 72.8 | 68 |
| Example 6 | 86.2 | 84.5 | 86.2 |

TABLE 3-continued

|  | 100% Cotton (degrees) | Water (degrees) | IPA (degrees) |
|---|---|---|---|
| Example 7 | 95.3 | 96.3 | 89.5 |
| Example 8 | 88.6 | 86.2 | 75.4 |
| Example 9 | 89 | 90.9 | 75.1 |
| Example 10 | 98.7 | 97.9 | 96.2 |
| Example 11 | 100.2 | 99.3 | 97.2 |
| Example 12 | 101.0 | 100.2 | 96.5 |

As used herein, all percentages (%) are percent by weight of the total composition, also expressed as weight/weight %, % (w/w), w/w, w/w % or simply %, unless otherwise indicated. Also, as used herein, the terms "wet" refers to relative percentages of the coating composition in a dispersion medium (e.g. water); and "dry" refers to the relative percentages of the dry coating composition prior to the addition of the dispersion medium. In other words, the dry percentages are those present without taking the dispersion medium or solvating medium into account. Wet admixture refers to the coating composition with the dispersion medium or solvating medium added. "Wet weight percentage", or the like, is the weight in a wet mixture; and "dry weight percentage", or the like, is the weight percentage in a dry composition without the dispersion medium. Unless otherwise indicated, percentages (%) used herein are dry weight percentages based on the weight of the total composition.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

Application of the afore-described coating constituents is advantageously applied in conjunction with a nebulization system. Such systems suitably include atomizers or aspirator nozzles or a suitable Venturi spray head or fluid applicator, and may comprise a spray system analogous to applicators available in conjunction with air brush systems. Further variants include fluid application via electrostatic processes, ultrasonic nozzles or centrifugal-based application systems. Further details relative to example embodiments for applicators are described further below.

Turning now to FIG. 1, illustrated is an example embodiment of a coating application system 100 that can be used in conjunction with application of coatings described herein. An applicator 110 can be associated with a positioning system 104 that can be configured for relative motion to a work piece 102. Coating can be supplied from one or more reservoirs, such as coating reservoir 112, as illustrated. Coating can be fed by gravity from a reservoir sitting atop the airbrush (called gravity feed) or siphoned from a reservoir mounted below (bottom feed) or on the side (side feed), for example. In an example embodiment detailed below, applications can include spraying of circuit board stencils (e.g., SMT stencils). In such applications, it may be preferable to use a bottom feed system where the coating is drawn up from a bottle of a defined and larger volume. The bottle can be refilled manually or automatically, or can simply be replaced with a full bottle. In another example embodiment, coating can be applied under pressure, such as at two atmospheres, to facilitate deposition.

Applicator 110 can include one or more sprayers, such as that illustrated by sprayer 114. In the illustrated embodiment of FIG. 1, two-dimensional relative movement between work piece 102 and applicator 110 can be accomplished in a first "x" axis and a complementary "y" axis by operation of drive units 120 and 122, respectively. In an example embodiment, shafts 130 and 132 can be rotated about their axes by rotational movement driven by drive units 120 and 122, respectively, such as by incorporation of a screw drive mechanism or other mechanisms to urge relative movement of applicator 110. Applicator 110 can include a suitable mount for attachment to the shafts 130 and 132. Control of drive units 120 and 122 can be made in conjunction with a control system 140. The control system 140 can be set or controlled manually or via an associated controller system.

Control system 140 can include a computer system 144. Computer system 144 can include one or more processors illustrated by CPU 148, working in conjunction with data storage as illustrated by memory 150 and an input/output subsystem 152. The computer system can include a user interface 156, which can include a video display and user input such as a keyboard, mouse, or any other suitable data input.

Computer system 140 can be provided with a network interface 160 for data communication with other systems via direct connection, local area network connection or wide area network connection, such as the Internet, as illustrated by connection to cloud 164. Implementation of computer control for a coating application can allow for preset or adaptive control of nozzle flow or applicator velocity relative to a work piece. Such control may facilitate uniform or repetitive application of coatings in accordance with empirically derived or calculated application parameters, such as one or more of nozzle flow, applicator velocity, applicator property, coating property, or work piece property, as well as parameters that may be based on environmental conditions such as temperature, ambient pressure or humidity levels.

Figure 2:
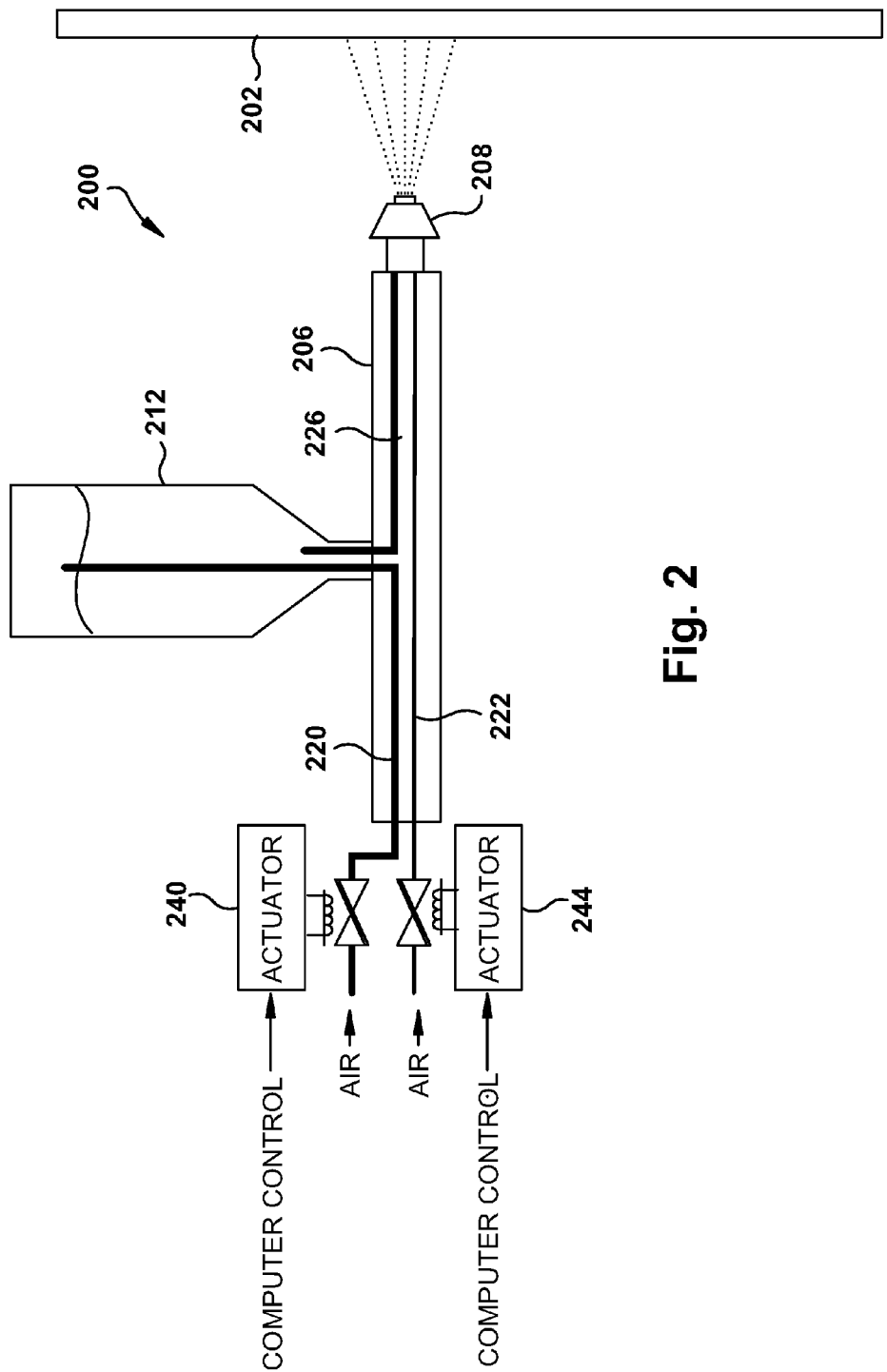
FIG. 2 is a simplified block diagram of at least one embodiment of an applicator for applying a coating to a work piece.

Turning now to FIG. 2, illustrated is an example embodiment of an applicator 200 that can include an air brush application system that can supply coating to work piece 202. The applicator 200 can include a body 206 and a nozzle 208 configured to supply coating supplied by coating reservoir 212. In the illustrated example, ducts 220 and 222 can supply air to reservoir 212 and nozzle 208, respectively, where coating can be urged from reservoir 212 to nozzle 208 via duct 226 and atomizing air is supplied via duct 222.

In the illustrated example embodiment of FIG. 2, air pressure to duct 220 can be controlled by actuator 240 and air pressure to duct 22 can be controlled by actuator 244. The illustrated example includes solenoid actuators, but any suitable actuator is suitably implemented as will be appreciated by one of ordinary skill in the art. Actuators 240 and 244 can be controlled by a computer system, such as computer 144 detailed in conjunctions with FIG. 1, above.

With an internal mix airbrush the coating and air can mix inside the airbrush (in the tip) creating a finer atomized "mist" of paint, for example. Also suitable is an external mix airbrush wherein the air and coating can exit the airbrush before mixing with each other, which generally creates a larger coarser atomization pattern. External mix airbrushes may be less expensive and more suited for covering larger areas faster.

An advantage of external mixing may be that the coating does not dry out inside of the spray apparatus. This may be easier to clean and thus may reduce particles.

Even with the internal mix airbrush, only a small area in the interior of the gun may be exposed to the coating, such as one pin and its barrel, so there may be little chance of building up and cleaning ease may be improved. The "standard" type of HPLV spray head may have many wetted parts and multiple air pathways. This complexity may make it a challenge for cleaning as these hydrophobic coatings preferentially stick to metal surfaces.

By way of example, suitable air brushes can be provided by Paache H, of Paache Company, 4311 N. Normandy Avenue, Chicago, Ill. 60634-1395 or Aztec A220 from Testor Corporation, 11 Hawthorn Parkway Vernon Hills, Ill. 60061.

Figure 3:
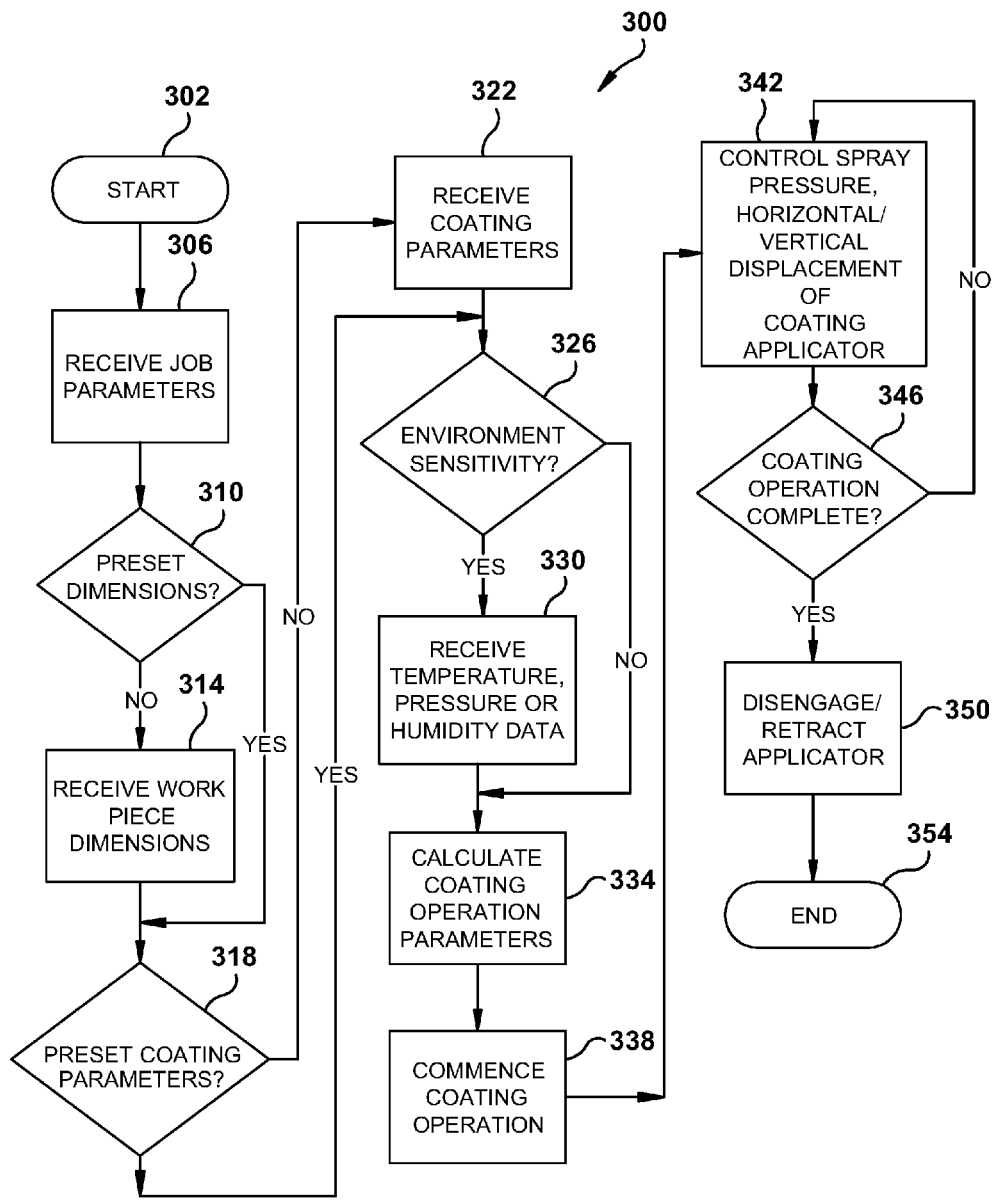
FIG. 3 is a simplified flow diagram of at least one embodiment of an operation for coating a work piece that may be performed by the coating application system of FIG. 1 or the applicator of FIG. 2.

Turning now to FIG. 3, illustrated is an example embodiment of a coating operation 300. The coating operation 300 can commence at 302. Data associated with parameters associated with a coating operation, such as coating properties, work piece properties, applicator properties, or the like, can be received at 306. If work piece dimensions are not preset as determined at 310 they can be received at 314. Once work piece dimensions are ascertained, a similar determination can be made relative to parameter coating parameters at 318 where parameter coatings can be received at 322 when not otherwise preset.

A determination can be made at 326 as to whether environmental issues are to be taken in to account. If so, data associated with environmental conditions such as temperature, pressure or humidity can be obtained at 330. Once relevant data is obtained, a calculation of coating operation parameters can be made at 334. Such parameters can include air pressure control, movement control, coating selection, or the like. Commencement of a coating operation can occur at 338 and application control made at 342. A determination as to completion of a coating operation can be made at 346, and once completed, an applicator can be suitably disengaged and/or retracted at 350 leading to an end of the process at 354.

It will be appreciated that control of a coating operation 300 such as that illustrated with the example embodiment of FIG. 3 can be suitably accomplished with the computer or control systems, illustrated above, as well as in conjunction with further example embodiments detailed below.

Turning now to FIG. 4, illustrated is another example embodiment of a coating applicator 400 with complementary views provided by FIGS. 4(A) and 4(B). The applicator in the illustrated embodiment is comprised of an array of individual spray systems 410a, 410b, 410c and 410d. The example embodiment illustrates the spray systems as being affixed in a linear array by mount 420. The spray systems 410 can move in a direction d perpendicularly relative to one or more work pieces. In further example embodiments, the spray systems 410 can be suitably moved in a complementary direction d'. In further variations, the spray systems 410 can be suitably moved relative to a work piece at an angle offset relative to movement resulting in spray patterns that are temporally offset from application of a particular portion while resulting in coating areas that are closer together relative to distance between spray systems 410. It will be further appreciated that spray systems 410 can be suitably disposed in adjacent relationship relative to work piece movement to affect application of multiple coats in a single pass.

Turning now to FIG. 5, illustrated is another example embodiment of a coating applicator 500 with complementary views provided by FIGS. 5(A) and 5(B). In the illustrated example embodiment, an array of spray systems 510a, 510b, 510c can be affixed in a rotatable mount 520 and can be positioned to enable rotational movement r relative to one or more work pieces. It will be appreciated that further example embodiments include non-linear relative orientation of the spray systems 510, or offset or overlapping orientation as described above in connection with FIG. 4.

Figure 6:
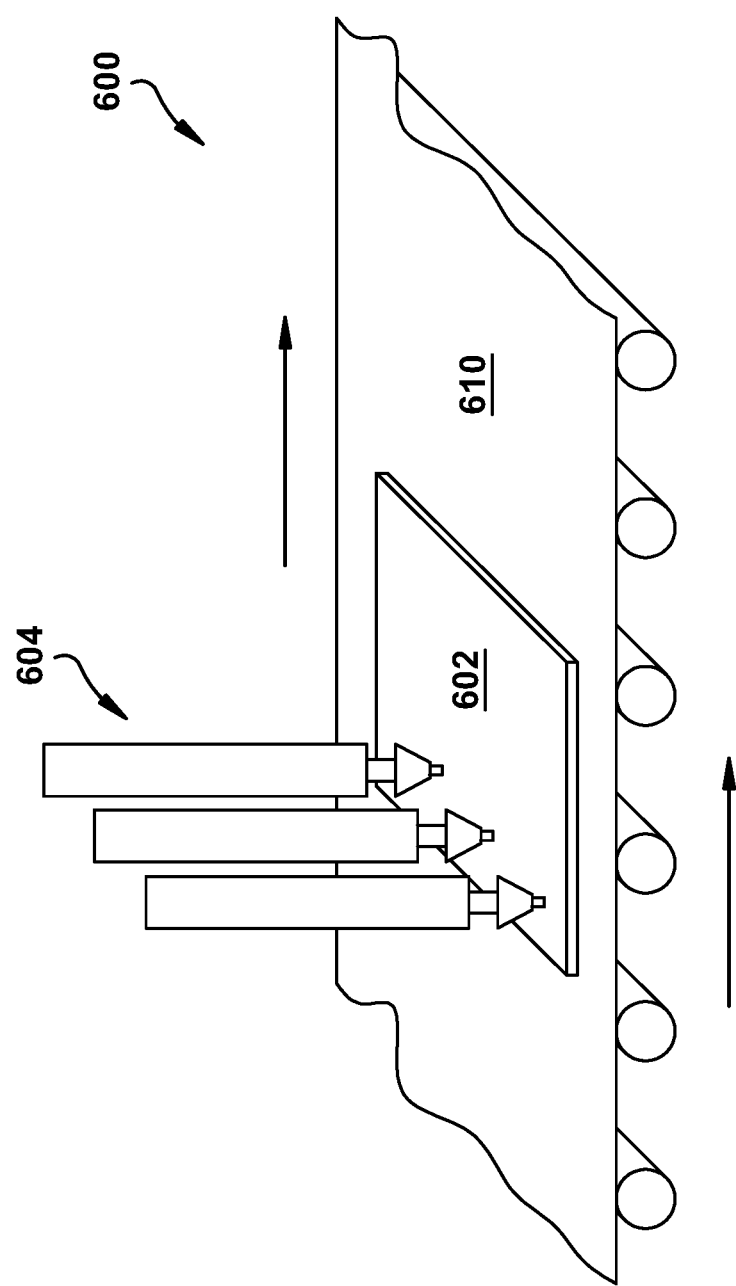
FIG. 6 is a simplified block diagram of at least one embodiment of a coating application system for serially coating work pieces on a conveyor.

FIG. 6 illustrates another example embodiment where one or more work pieces 602 can be moved relative to one or more spray systems 604 via a conveyor 610. It will be appreciated that drive mechanism 600 can facilitate coating multiple work pieces 602 in a serial fashion by movement of the conveyor 610 in the direction d.

In an example embodiment, the coating applied in connection with the forgoing description can be used in connection with manufacture of electronic devices, such as with printed circuit boards. Solder paste stencils (e.g., SMT stencils) are often used in the electronics assembly industry to selectively deposit solder paste onto circuit boards and other electronic interconnects. The stencil can be constructed of a thin metal foil, typically of stainless steel or nickel, and has apertures that are cut typically with a laser. A high viscosity paste is pushed through the apertures with a squeegee and onto the pads of a circuit board. When the components are then inserted onto the board, the metal leads are pushed into the paste, and the paste is reflowed and cooled to provide an interconnection.

Figure 7:
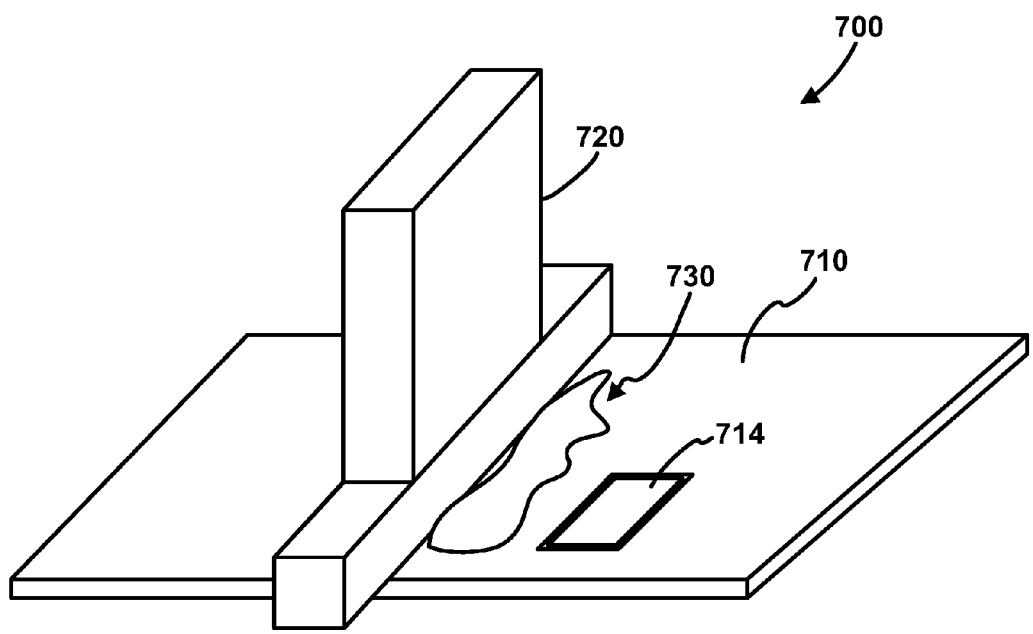
FIG. 7 is a simplified block diagram of at least one embodiment of a system for applying solder paste to a printed circuit board.

Turning to FIG. 7, illustrated is an example embodiment of a solder paste application 700. A printed circuit board stencil 710 includes one or more apertures such as the one illustrated at 714. Squeegee 720 can used to apply high viscosity paste 730. The paste can be pushed through the one or more apertures to accomplish interconnection as noted above.

As circuit boards and components have gotten smaller in size, so has the size and aspect ratio of stencil apertures. Solder paste tends to stick to the aperture walls. The reduction in size and aspect ratio of the apertures has led to difficulties transferring sufficient volumes of solder paste to establish a dependable solder joint. Hydrophobic and oleophobic repellent coatings, such as those detailed herein, may help address this problem. These coatings can be sprayed onto the surface of the stencil that is in contact with the circuit board. In the process, some coating can penetrate the apertures and can be coated onto the walls. This coating can provide a non-stick function allowing more paste to be transferred through the apertures. The coating on the stencil surface can provide an easy to clean property, requiring less cleaning cycles during the printing process. With airbrush spraying, stencils can be sprayed vertically allowing for smaller footprint of equipment. In a further example embodiment, spraying can be accomplished in multiple passes and multiple directions to facilitate optimized coating deposition.

As discussed herein, certain types of functional coatings, particularly hydrophobic and oleophobic coatings, when applied to the working surfaces of solder paste stencils can provide benefits, efficiencies and cost savings. For example, when hydrophobic and oleophobic coatings are applied to the print side of the stencil 710, they can prevent the solder paste build up which is frequently the normal result of solder paste printing. Without a coating, as the squeegee 720 passes over a particular aperture 714, paste 730 may be squeezed under the stencil 710 and can build up on the print side, with each successive print. Unless this excess is removed, it can transfer onto the subsequent circuit board being printed, producing unwanted results such as bridging, poor profiles, misprints and other defects. This excess solder paste can be removed by cleaning with absorbent wiping materials, in an automatic or manual process, with or without additional liquid cleaning agents but these wiping and liquid materials can be costly and the use of them may reduce the overall efficiency of the process.

A hydrophobic and oleophobic coating (e.g., a curable coating composition including a polysilazane and a fluoroacrylate copolymer) can also be applied to the walls of the apertures 714 of the stencil 710. Smaller component sizes may require smaller solder lands, which in turn can result in smaller apertures and lower aspect ratios. Smaller pads can mean reduced tack force for allowing the solder paste 730 to be pulled from the aperture 714. The coating can impart a reduced friction surface to the wall allowing solder paste 730 to pass through more easily. The coating can also smooth out the surface of the apertures 714 which can be relatively rough because of the process of cutting, typically with a laser, and the roughness can be in the range of about 0.1 microns to about 0.5 microns or more. The coating thus can increase transfer efficiency and can lead to a more accurate and uniform printing.

In some embodiments, the hydrophobic and oleophobic coatings that can be applied to the print side of the stencil 710 may be relatively thin, even nanometers thick, for example, in the range of about 10 nanometers to about 100 nanometers thick. In other embodiments, the hydrophobic and oleophobic coatings that can be applied to the print side of the stencil 710 may be relatively thick, for example, in the range of about 0.5 microns (500 nanometers) to about 5 microns (5000 nanometers) thick. The thin and thick coatings can each have certain strengths and weaknesses such that different applications may benefit from different coating ranges.

The thin print-side coatings may be for example, monomolecular layers and can be comprised of, for example, of silane or phosphonate functional molecule. In this case, the silane or phosphonate moieties comprise the molecule's head and can form chemical bonds by means of oxide groups present on the surface of the stencil 710, which in most cases may be stainless steel or nickel. The hydrophobic and oleophobic groups can form the tails of the molecule, comprised of, for example, organic, silane or fluoro-organic groups which align with the air interface, regularly ordering themselves until a continuous film is formed. Other thin coatings can be comprised of monomers, oligomers and polymer coatings, multilayer coatings that chemically or physically bond to the stencil surface and then produce a hydrophobic and oleophobic surface at the air interface. In some embodiments, the thin coatings can be a fluoroalkoxysilane, which can include the following structure:

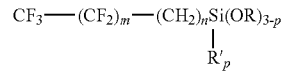

where m=0 to 15; n=1 to 5; p=0, 1, 2; each R is an alkyl, each R' is an alkyl or H. The thin coatings can also be an organophosphonic acid, which can have the following structure:

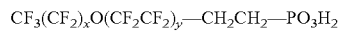

where x is 0 to 7, y is 1 to 20 and x+y≤27, or a derivative thereof selected from acid salts and acid esters, dissolved or dispersed in a liquid diluent, in a container substantially impervious to the diluent.

Such monomolecular coatings can conform to the surface of the substrate, even the relatively small dimensional pore structure inherent in metallic surfaces such as stainless steel or nickel, which is commonly used to construct solder paste stencils (e.g., SMT stencils). The ability to penetrate and bond to the surface in this way can permit these coatings to provide excellent abrasion resistance. These thin coatings can be applied to the print side of the stencil 710 after the apertures 714 are produced and may be wiped on, sprayed on or applied by other methods. These coatings when wiped or even sprayed on can have little effect on the ease of paste transfer or transfer efficiency of the stencil 710, since the wiping application does not lead to coating of the aperture walls. In addition, even when sprayed these coatings may be too thin to smooth out the inherently rough walls of the apertures. Therefore, the thin coatings may be used to improve the ease of cleaning and a repellency of solder paste and flux on the print side of the foil.

Another potential beneficial feature of the thin hydrophobic and oleophobic coatings is that they may be applied to the stencil substrate prior to the apertures being produced in the substrate. This can be done by the substrate manufacturer or stencil manufacturer and can lead to process efficiencies. Another example feature of these thin print-side coatings is that if they wear off, they can be easily re-applied, even by the end user, using the same spray or wipe-on or other methods.

Thicker hydrophobic and oleophobic coatings, in the range of about 0.5 microns (500 nanometers) to about 5 microns (5000 nanometers) may also be applied to the print side of the stencil 710. These coatings may be comprised of, for example, silane polymers, siloxane and polysiloxane and other silicon based polymers and others, that form continuous coatings by binding to the oxide groups on the surface through silane or phospahate functional groups. Other organic, silane or fluoroorganic groups on the polymer or chemical matrix can be aligned at the air interface to provide the hydrophobicity and oleophobicity. These thicker coatings can be only applied to the stencil substrate after the apertures are produced, for example. If the coating is applied prior to cutting of the apertures, when the apertures are cut into the substrate typically by a laser, the laser may melt or char the coating around the aperture leading to a poorly defined aperture shape. In some embodiments, the thick coatings may be a metal alkoxide. For example, the metal alkoxide coating can include at at least one alkoxide of one or more of the elements aluminum (Al), silicon (Si), tantalum (Ta), titanium (Ti), zirconium (Zr), hafnium (Hf) or yttrium (Y). With corresponding metal alkoxides, it is then possible to form particularly suitable, thermally stabile coating materials in the form of so-called hybrid polymers (with the alkoxide and an organic network). In other embodiments, the thick coatings can be a chlorine terminated polydimethylsiloxane oligomer. In such embodiments, a reaction can occur between the cholrines with hydroxy and silanol groups of glass, metal oxide surfaces, and siliceous surfaces to form a chemically bound polydimethylsiloxane "siliconized" surface.

The thicker coatings can be applied by some type of spray process, for example by HVLP or an air brush spray process. This application process can also allow coating of the aperture walls to impart the hydrophobic and oleophobic function to reduce friction and improve solder paste flow. These thicker coatings can also smooth out the rough surface of the aperture walls. Combined, these features can improve the transfer efficiency of the stencil and permit more accurate printing, allowing smaller features and components to be manufactured.

The thicker hydrophobic and oleophobic coatings may be more susceptible to adhesion and delamination failures after many print cycles due to the constant flexing and stresses involved in the process. Such failures typically occur on the print side of the stencil due the movement of the squeegee, contact of the circuit board being printed and other surface effects. Typically, the coating in the apertures stays intact and no loss of adhesion or reduction takes place even after many prints and even if loss of adhesion or delamination occurs in the coating on the print side. Because the thicker coatings are typically applied by the stencil manufacturer with specialized equipment, the end user of the stencil cannot easily repair or recoat the stencil when an adhesion failure occurs. Therefore, these thicker hydrophobic and oleophobic coatings may not be satisfactory for long running print cycles, where the stencil will be used for 5,000, 10,000, 20,000, 50,000 or more print cycles. However, it will be appreciated that any such use is contemplated.

A hybrid application technology is disclosed herein which takes advantage of the inherent benefits of both the thin and thick hydrophobic and oleophobic coatings. More specifically, a thin coating can be applied to the surface of the print side of the stencil. Additionally, a thicker coating can be applied to the walls of the apertures. The hybrid application technology can impart easy-to-clean functionality to the print side surface and an improvement in transfer efficiency to the apertures. Further, the hybrid application technology can allow the thin coating on the surface to be reapplied easily by the end user, when necessary, at relatively low cost. Thus, solder paste stencils (e.g., SMT stencils) with an improved print-side easy-to-clean function and improved paste release and transfer efficiency that will remain functional for long run production SMT stencils can be cost effectively produced.

Figures 8, 9:
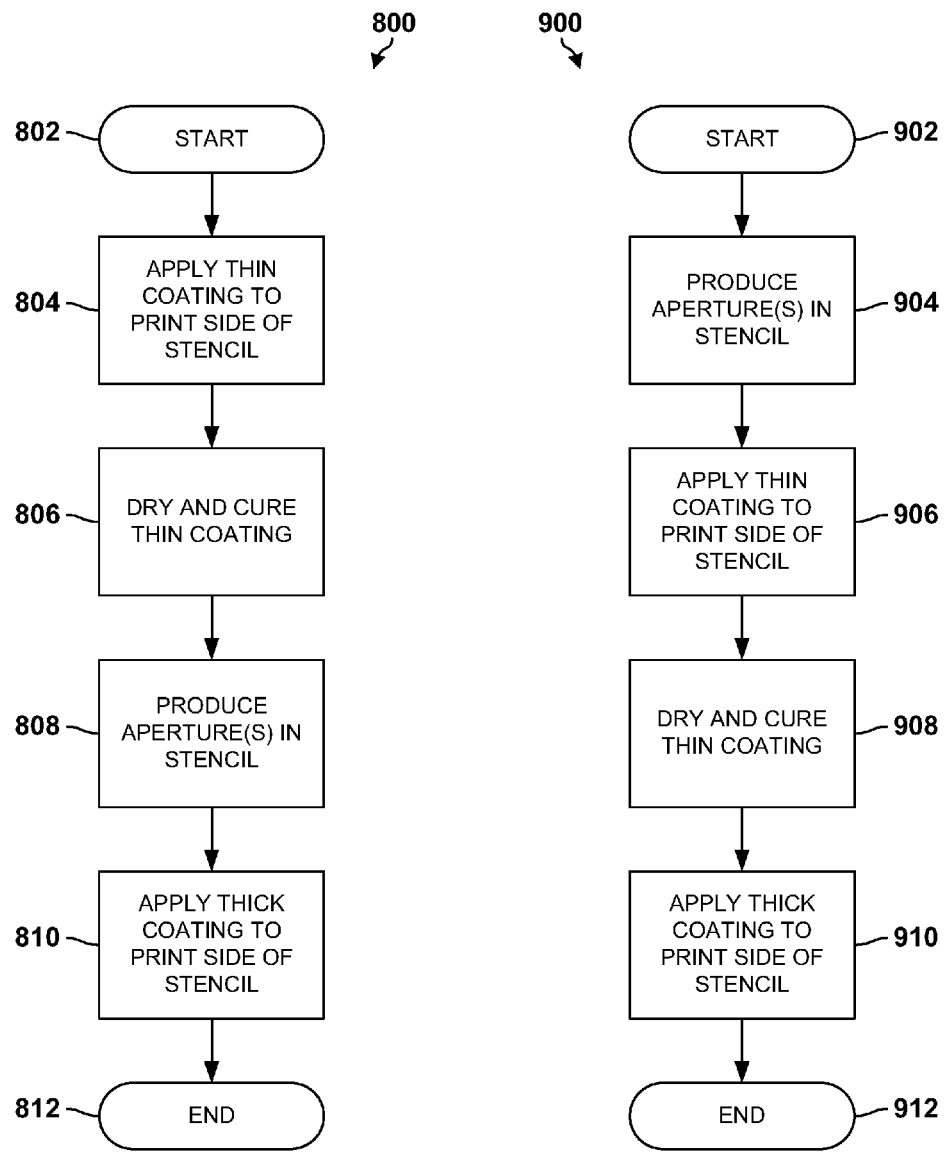
FIG. 8 is a simplified flow diagram of at least one embodiment of a process for applying multiple coatings to a solder paste stencil.
FIG. 9 is a simplified flow diagram of at least one embodiment of an alternative process for applying multiple coatings to a solder paste stencil.

Referring now to FIG. 8, a hybrid process 800 for applying multiple coatings to a solder paste stencil (e.g., an SMT stencil) is illustratively shown. The hybrid application process 800 can commence at block 802. In block 804, a thin hydrophobic and oleophobic coating can be applied to the stencil substrate prior to producing the apertures. The stencil substrate can be, or otherwise include, stainless steel, nickel, or any other type of substrate metal. In some embodiments, the thickness of the thin coating can be in a range of from about 0.1 microns to about 1 microns (or about 100-1000 nanometers) thick. In another embodiment, the thickness of the thin coating can be in a range from about 0.01 microns to about 0.1 microns (or about 10-100 nanometers) thick. In yet another embodiment, the thickness of the thin coating can be in a range from about 0.001 microns to about 0.01 microns (about 1-10 nanometers) thick. Additionally, the thin coating can have the working structure of, for example, monomolecular layers and can be comprised of, for example, silane or phosphonate functional molecule with, for example fluorocarbon functionality. In this case, the silane or phosphonate moieties can comprise the molecule's head and form chemical bonds by means of oxide groups present on the surface of the stencil, which can in most cases be stainless steel or nickel. The hydrophobic and oleophobic groups comprised of, for example fluorocarbon functionality, can form the tails of the molecule, which can align with the air interface, regularly ordering themselves until a continuous film is formed. The thin hydrophobic and oleophobic coating can be applied to the stencil by spraying, wiping, roll coating, spin coating, knife coating or other effective means, to apply a continuous coat at the correct and even thickness.

Subsequently, in block 806, the thin hydrophobic and oleophobic coating can be dried and/or cured by ambient temperature or heat, depending on the coating makeup. It will be appreciated that in some embodiments drying and curing can happen simultaneously, where in other embodiments heat or other action may separately be taken to cure the composition. Next, in block 808, one or more apertures can be produced or formed in the stencil. In some embodiments, the aperture(s) are cut or drilled into the stencil by a laser or any other suitable mechanism for forming apertures in solder paste stencils. It should be appreciated that at this stage of the process, the thin hydrophobic and oleophobic coating may only be coated on the print side surface of the stencil.

In block 810, a thick hydrophobic and oleophobic coating can be applied to the entire print side surface of the stencil. In the illustrative embodiment, the thick hydrophobic and oleophobic coating can be applied in a manner such that it enters and covers the walls of the aperture(s) formed in the stencil. In some embodiments, the thickness of the thick hydrophobic and oleophobic coating is in the range from about 0.1 microns to about 0.5 microns (about 100-500 nanometers) thick. In another embodiment, the thickness of the thick hydrophobic and oleophobic coating is in the range from about 0.5 microns to about 5 microns (about 500-5000 nanometers) thick. The thick coating may be comprised of, for example, silane polymers, siloxane and polysiloxane and other silicon based polymers and others that can form continuous coatings by binding to the oxide groups on the surface through silane or phosphonate functional groups. Other organic, silane or fluoroorganic groups on the polymer or chemical matrix can be aligned at the air interface to provide the hydrophobicity and oleophobicity. The thick hydrophobic and oleophobic coating can be applied to the stencil by spraying or other effective means. It should be appreciated that at this stage of the process, the thick hydrophobic and oleophobic coating may only adhere to the walls of the stencil aperture(s) since the print side already has a non-stick coating (i.e., the thin hydrophobic and oleophobic coating). The process 800 can then end at block 812.

Referring now to FIG. 9, another hybrid process 900 for applying multiple coatings to a solder paste stencil (e.g., an SMT stencil) is illustratively shown. The hybrid application process 900 can commence at block 902. In block 902, one or more apertures can be produced or formed in the stencil. In some embodiments, the aperture(s) can be cut or drilled into the stencil by a laser or any other suitable mechanism for forming apertures in solder paste stencils. The stencil substrate can be, or otherwise include, stainless steel, nickel, or any other type of substrate metal.

Subsequently, in block 906, a thin hydrophobic and oleophobic coating can be applied to the print side surface of the stencil substrate. In some embodiments, the thickness of the thin coating may be in a range from about 0.1 microns to about 1 micron (about 100-1000 nanometers) thick. In another embodiment, the thickness of the thin coating may be in a range from about 0.01 microns to about 0.1 microns (about 10-100 nanometers) thick. In yet another embodiment, the thickness of the thin coating may be in a range from about 0.001 microns to about 0.01 microns (about 1-10 nanometers) thick. Additionally, the thin coating can have the working structure of, for example, monomolecular layers and can be comprised of, for example, silane or phosphonate functional molecule. In this case the silane or phosphonate moieties can comprise the molecule's head and can form chemical bonds by means of oxide groups present on the surface of the stencil, which is in most cases, stainless steel or nickel. The hydrophobic and oleophobic groups can form the tails of the molecule, and can contain for example, fluorocarbon functionality which can align with the air interface, regularly ordering themselves until a continuous film is formed. The thin hydrophobic and oleophobic coating can be applied to the stencil by spraying, wiping, roll coating, spin coating, knife coating or other effective mechanism, to apply a continuous coat at the correct and even thickness.

Block 906 can include applying the thin hydrophobic and oleophobic coating in a manner such that the coating substantially avoids filling or moving into the apertures defined by the workpiece. For example, wiping, spraying, or application techniques can be used that limit, minimize, or substantially prevent the thin coating from filling the apertures such that the one or more walls of the apertures can subsequently be coated with a thick hydrophobic and oleophobic coating as described herein. In one embodiment, a mask or filler can be used to fill all or a portion of the apertures prior to application of the thin coating such that the thin coating is unable to coat the one or more walls of the apertures. In one embodiment, the filler can be a soluble material that after coating with the thin hydrophobic and oleophobic coating can be removed such that the one or more walls of the apertures are exposed.

Next, in block 908, the thin hydrophobic and oleophobic coating can be dried and/or cured by ambient temperature or heat, or by any other suitable mechanism such as ultraviolet radiation, chemical additives, electron beams, or the like, depending on the coating makeup. It should be appreciated that at this stage of the process, the thin hydrophobic and oleophobic coating may be the only coating on the print side surface of the stencil.

In block 910, a thick hydrophobic and oleophobic coating can be applied to the entire print side surface of the stencil. In the illustrative embodiment, the thick hydrophobic and oleophobic coating can be applied in a manner such that it enters and covers the walls of the aperture(s) formed in the stencil. In some embodiments, the thickness of the thick hydrophobic and oleophobic coating can be in the range from about 0.1 microns to about 0.5 microns (about 100-500 nanometers) thick. In another embodiment, the thickness of the thick hydrophobic and oleophobic coating can be in the range from about 0.5 microns to about 5 microns (about 500-5000 nanometers) thick. The thick coating may be comprised of, for example, silane polymers, siloxane and polysiloxane and other silicon based polymers and others that form continuous coatings by binding to the oxide groups on the surface through silane or phosphonate functional groups. Other organic, silane or fluoroorganic groups on the polymer or chemical matrix can be aligned at the air interface to provide the hydrophobicity and oleophobicity. The thick hydrophobic and oleophobic coating can be applied to the stencil by spraying or other effective means. It should be appreciated that at this stage of the process, the thick hydrophobic and oleophobic coating may only adhere to the walls of the stencil aperture(s) since the print side already has a non-stick coating (i.e., the thin hydrophobic and oleophobic coating). The process 900 can then end at block 912.

Figure 10:
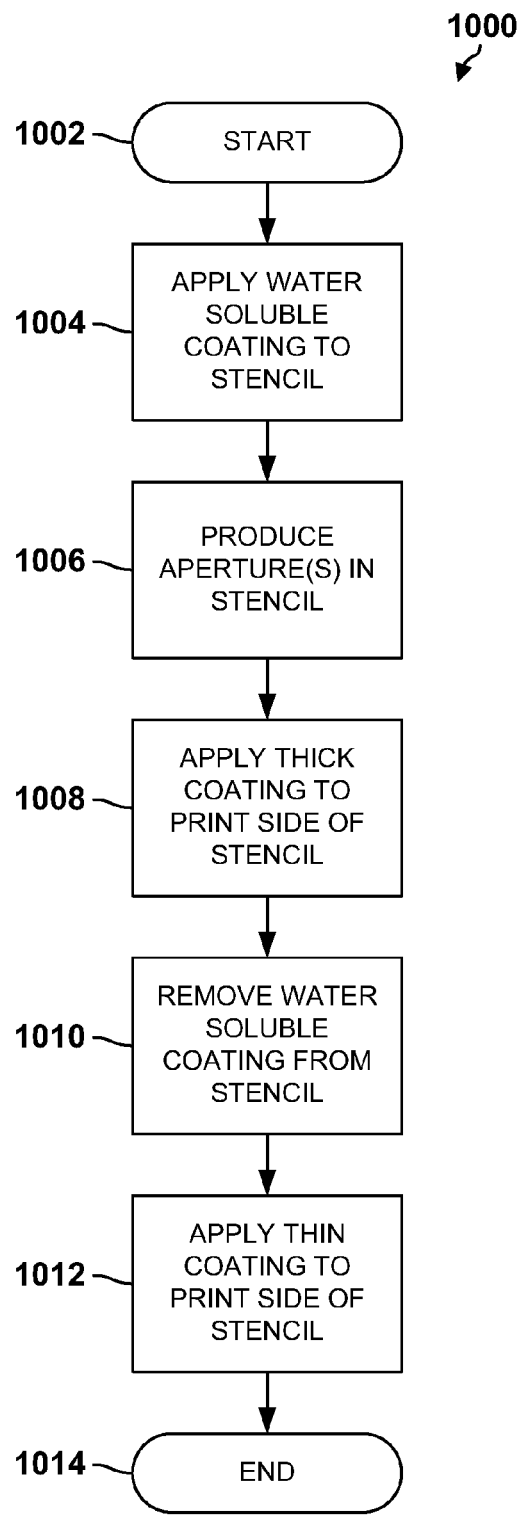
FIG. 10 is a simplified flow diagram of at least one embodiment of an alternative process for applying multiple coatings to a solder paste stencil.

Referring now to FIG. 10, a hybrid process 1000 for applying multiple coatings to a solder paste stencil (e.g., an SMT stencil) is illustratively shown. The hybrid application process 1000 can commence at block 1002. In block 1004, a soluble coating can be applied to the stencil substrate prior to producing the apertures. The stencil substrate can be, or otherwise include, stainless steel, nickel, or any other type of substrate metal. In some embodiments, the thickness of the soluble coating can be in a range of from about 0.1 microns to about 1 microns (or about 100-1000 nanometers) thick. In another embodiment, the thickness of the soluble coating can be in a range from about 0.01 microns to about 0.1 microns (or about 10-100 nanometers) thick. In yet another embodiment, the thickness of the soluble coating can be in a range from about 0.001 microns to about 0.01 microns (about 1-10 nanometers) thick. The soluble coating can be applied to the stencil by spraying, wiping, roll coating, spin coating, knife coating, dipping, or other effective means, to apply a continuous coat. The soluble coating can be, for example, water soluble and can include acrylic or polyvinyl alcohol (PVA). It will be appreciated that any suitable soluble material can be used to coat the stencil or work piece, such as a soluble material to which the hydrophobic and/or oleophobic coating will not adhere. It will be appreciated that the soluble material can be dried or cured as appropriate before transitioning to subsequent steps.

In block 1006, one or more apertures can be produced or formed in the stencil or work piece. In some embodiments, the aperture(s) can be cut or drilled into the stencil by a laser or any other suitable mechanism for forming apertures in solder paste stencils. It should be appreciated that at this stage of the process, the thin hydrophobic and oleophobic coating may only be coated on the print side surface of the stencil. During this stage of the process, the apertures can be formed in the stencil or work piece such that the one or a plurality of apertures are defined by one or more walls. The one or more walls may be substantially free of the soluble material because the outer surface of the apertures was not exposed to the soluble material during the coating process. Once the apertures are formed, the one or more walls of the aperture may now be exposed such that they can be coated with a hydrophobic and oleophobic coating.

In block 1008, a thick hydrophobic and oleophobic coating can be applied to the entire print side surface of the stencil. In the illustrative embodiment, the thick hydrophobic and oleophobic coating can be applied in a manner such that it enters and covers the walls of the aperture(s) formed in the stencil. In some embodiments, the thickness of the thick hydrophobic and oleophobic coating is in the range from about 0.1 microns to about 0.5 microns (about 100-500 nanometers) thick. In another embodiment, the thickness of the thick hydrophobic and oleophobic coating is in the range from about 0.5 microns to about 5 microns (about 500-5000 nanometers) thick. The thick coating may be comprised of, for example, silane polymers, siloxane and polysiloxane and other silicon based polymers and others that can form continuous coatings by binding to the oxide groups on the surface through silane or phosphonate functional groups. Other organic, silane or fluoroorganic groups on the polymer or chemical matrix can be aligned at the air interface to provide the hydrophobicity and oleophobicity. The thick hydrophobic and oleophobic coating can be applied to the stencil by spraying or other effective means. It should be appreciated that at this stage of the process, the thick hydrophobic and oleophobic coating may only adhere to the walls of the stencil aperture(s) since the print side has been substantially covered with a non-stick soluble coating. In this manner the one or more walls of the one or a plurality of apertures can be coated, but the remainder of the stencil or work piece will not adhere to the thick hydrophobic and oleophobic coating. It will be appreciated that the thick hydrophobic and oleophobic coating can be dried or cured in any suitable manner before proceeding to the next stage.

In block 1010, the soluble coating can be removed with a solvent or other material designed to remove the soluble coating. In one embodiment, the soluble coating is acrylic or polyvinyl alcohol, where the soluble coating can be removed from the stencil or workpiece by bathing or rinsing the work piece in water. Sufficient water can be applied such that the only coating remaining on the stencil is the thick hydrophobic and oleophobic coating present on the one or more walls of the one or a plurality of apertures.

In block 1012, a thin hydrophobic and oleophobic coating can be applied to the stencil substrate. With the soluble coating now removed the surface of the stencil or work piece can now adhere to the thin hydrophobic and oleophobic coating. In some embodiments, the thickness of the thin coating can be in a range of from about 0.1 microns to about 1 microns (or about 100-1000 nanometers) thick. In another embodiment, the thickness of the thin coating can be in a range from about 0.01 microns to about 0.1 microns (or about 10-100 nanometers) thick. In yet another embodiment, the thickness of the thin coating can be in a range from about 0.001 microns to about 0.01 microns (about 1-10 nanometers) thick. Additionally, the thin coating can have the working structure of, for example, monomolecular layers and can be comprised of, for example, silane or phosphonate functional molecule with, for example fluorocarbon functionality. In this case, the silane or phosphonate moieties can comprise the molecule's head and form chemical bonds by means of oxide groups present on the surface of the stencil, which can in most cases be stainless steel or nickel. The hydrophobic and oleophobic groups comprised of, for example fluorocarbon functionality, can form the tails of the molecule, which can align with the air interface, regularly ordering themselves until a continuous film is formed. The thin hydrophobic and oleophobic coating can be applied to the stencil by spraying, wiping, roll coating, spin coating, knife coating or other effective means, to apply a continuous coat at the correct and even thickness. In the example embodiment, the thick coating present on the one or more walls of the one or a plurality of apertures may remain substantially unchanged. It will be appreciated that the thin coating can be cured or dried by any suitable mechanism or method. The process 1000 can then end at block 1014. Although described with reference to the print face of the stencil it will be appreciated that the soluble coating, thin coating, and thick coating can be applied to any suitable region of the work piece in any suitable order.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A method comprising:
   receiving into a sprayer a curable coating comprised of a polysilazane and a fluoroacrylate copolymer;
   receiving an air flow control signal;
   receiving a position control signal;
   positioning a work piece relative to a Venturi spray head in accordance with the position control signal; and
   applying the coating to the work piece via the Venturi spray head, the Venturi spray head operated in accordance to the air flow control signal; and
   wherein the fluoroacrylate copolymer is included at about 1 part fluoroacrylate copolymer to about 3 parts to about 800 parts polysilazane.

2. The method of claim 1, further comprising calculating one or more of a value of the air flow control signal or a value of the position control signal in accordance with an environmental parameter.

3. The method of claim 2, wherein the environmental parameters include one or more of data corresponding to ambient pressure, temperature, or humidity proximate to the work piece.

4. The method of claim 1, further comprising calculating one or more of a value of the air flow control signal or a value of the position control signal in accordance with data corresponding to a work piece dimension.

5. The method of claim 1, wherein the work piece is a solder paste stencil.

* * * * *